(12) United States Patent
Wallmeier et al.

(10) Patent No.: US 10,094,418 B2
(45) Date of Patent: Oct. 9, 2018

(54) WHEEL BEARING ASSEMBLY HAVING A TEMPERATURE-MEASURING DEVICE

(71) Applicant: SAF-HOLLAND GmbH, Bessenbach (DE)

(72) Inventors: Stefan Wallmeier, Goldbach (DE); Elmar Weber, Dülmen (DE)

(73) Assignee: SAF-HOLLAND GmbH, Bessenbach (DE)

( * ) Notice: Subject to any disclaimer, the term of this patent is extended or adjusted under 35 U.S.C. 154(b) by 227 days.

(21) Appl. No.: 15/032,242

(22) PCT Filed: Sep. 30, 2014

(86) PCT No.: PCT/EP2014/070852
§ 371 (c)(1),
(2) Date: Apr. 26, 2016

(87) PCT Pub. No.: WO2015/071022
PCT Pub. Date: May 21, 2015

(65) Prior Publication Data
US 2016/0273581 A1    Sep. 22, 2016

(30) Foreign Application Priority Data

Nov. 18, 2013 (DE) .......................... 10 2013 223 436

(51) Int. Cl.
*F16C 19/52* (2006.01)
*B60B 27/00* (2006.01)
(Continued)

(52) U.S. Cl.
CPC ........ *F16C 19/525* (2013.01); *B60B 27/0068* (2013.01); *F16C 41/008* (2013.01);
(Continued)

(58) Field of Classification Search
CPC .... F16C 19/525; F16C 41/008; F16C 19/548; F16C 43/04; F16C 2326/02; B60B 27/0068; G01K 11/12; G01K 13/00
See application file for complete search history.

(56) References Cited

U.S. PATENT DOCUMENTS 3,877,441 A    4/1975 Mach et al.
6,546,892 B2   4/2003 Kelly, Jr. et al.
(Continued)

FOREIGN PATENT DOCUMENTS

DE        2638416      3/1978
DE     202007004159    6/2007
JP       2009216230    9/2009

OTHER PUBLICATIONS

European Patent Office; International Search Report; dated Nov. 13, 2014.

*Primary Examiner* — Lisa Caputo
*Assistant Examiner* — Philip Cotey
(74) *Attorney, Agent, or Firm* — Price Heneveld LLP

(57) ABSTRACT

A wheel bearing assembly includes a wheel hub which is mounted on an axle element by at least one wheel bearing, and a temperature-measuring device, visible from outside the wheel bearing assembly, configured to measure and display the exceeding of a limit temperature in the wheel bearing, wherein the temperature-measuring device comprises at least two separate temperature-measuring elements, each of which is connected to the wheel bearing in a heat-conducting manner along a heat-conducting path and undergoes a visually identifiable change at a predetermined trigger temperature. The at least two temperature-measuring elements are disposed in such a way that, when the wheel bearing heats up, the elements heat up at different rates, and/or the temperature-measuring elements have different trigger temperatures.

26 Claims, 3 Drawing Sheets

(51) Int. Cl.
  *G01K 11/12* (2006.01)
  *G01K 13/00* (2006.01)
  *F16C 41/00* (2006.01)
  *F16C 43/04* (2006.01)
  *F16C 19/54* (2006.01)

(52) U.S. Cl.
  CPC ............ *G01K 11/12* (2013.01); *G01K 13/00* (2013.01); *F16C 19/548* (2013.01); *F16C 43/04* (2013.01); *F16C 2326/02* (2013.01)

(56) References Cited

U.S. PATENT DOCUMENTS

| | | | | |
|---|---|---|---|---|
| 8,118,372 B2* | 2/2012 | Koschinat | ............ | F16C 19/525 116/216 |
| 2002/0167401 A1* | 11/2002 | Hayes | ................... | G01M 13/04 340/449 |
| 2005/0052074 A1* | 3/2005 | Hennig | ................ | B60C 23/003 301/124.1 |
| 2008/0018445 A1* | 1/2008 | Shimura | ............. | B60C 23/0408 340/442 |
| 2008/0290722 A1* | 11/2008 | Koschinat | ............ | F16C 19/525 301/108.1 |
| 2012/0032793 A1 | 2/2012 | Sonzala et al. | | |
| 2016/0076948 A1* | 3/2016 | Ho le | .................... | G01K 13/08 340/449 |

* cited by examiner

WHEEL BEARING ASSEMBLY HAVING A TEMPERATURE-MEASURING DEVICE

BACKGROUND OF THE INVENTION

The temperature development of a wheel bearing is an essential indicator of the functional state of the bearing. For example, the failure of a wheel bearing is often indicated by a temperature increase. Regular monitoring of the temperature of the wheel bearing, therefore, is a suitable means for checking the proper performance and, therefore, the operational safety of the wheel bearing.

One possibility for monitoring the temperature of a wheel bearing is to provide a temperature sensor on the wheel bearing, which transmits a temperature signal to a display device in the cockpit of the vehicle. For example, the temperature can be measured by means of a resistor that changes its conduction as a function of temperature. Such temperature-measuring systems have not become commonplace in trailer vehicles, however. One reason therefor is that the infrastructure is complicated. Another reason is that performing measurements on revolving parts with a cable guide is complicated.

Another known method for detecting an overheating in a wheel bearing is to use a temperature label that irreversibly changes color when a defined temperature is reached. In this manner, it can be determined whether the wheel bearing has exceeded a certain temperature in the past.

A temperature monitoring of a wheel bearing by means of a thermal dot is known, for example, from DE 102 42 199 A1.

The problem addressed by the invention is that of providing a wheel bearing assembly in which an overheating can be determined in a simple, cost-effective, and meaningful manner.

SUMMARY OF THE INVENTION

The wheel bearing assembly, in particular a commercial-vehicle wheel bearing assembly, comprises, according to the invention, a wheel hub, which is mounted on an axle element by means of at least one wheel bearing, and a temperature-measuring device, visible from outside the wheel bearing assembly, for measuring and displaying the exceeding of a limit temperature in the wheel bearing. According to the invention, it is provided that the temperature-measuring device comprises at least two separate temperature-measuring elements, each of which is connected to the wheel bearing in a heat-conducting manner via or along a heat-conducting path and undergoes a visually identifiable change at a predetermined trigger temperature, wherein the at least two temperature-measuring elements are disposed in such a way that, when the wheel bearing heats up, they heat up at different rates, and/or the temperature-measuring elements have different trigger temperatures.

As a result of the wheel bearing assembly according to the invention, it is possible to not only enable a maximum peak temperature to be displayed, but it is also possible to identify whether the peak temperature occurred only briefly or prevailed for a relatively long time period.

According to one aspect of the invention, for this purpose, the at least two temperature-measuring elements, which are spatially separated from one another, are positioned and/or connected to the wheel bearing via the heat-conducting paths in such a way that a temperature increase in the wheel bearing is transmitted to the temperature-measuring elements at different rates. An elevated temperature of the wheel bearing is therefore transmitted to one of the temperature-measuring elements at a faster rate than to the other temperature-measuring element. If the elevated temperature occurs only briefly, the predetermined trigger temperature of the temperature-measuring elements is reached in only one of the temperature-measuring elements. The other temperature-measuring element, to which the temperature is transmitted at a slower rate, does not react in this case. However, if the superelevated temperature of the wheel bearing prevails for a relatively long time period, the second temperature-measuring element also reaches its trigger temperature. The wheel bearing assembly according to the invention comprising the separate, differently positioned temperature-measuring elements, therefore delivers a piece of information about the time period during which the specified limit temperature was exceeded in the wheel bearing. If the limit temperature occurred only briefly, only one of the temperature-measuring elements is triggered. If the limit temperature prevails for a relatively long time period, both of the temperature-measuring elements are triggered. Preferably, the temperature-measuring elements are positioned in such a way that the time difference between the attainment of the trigger temperature lies in the range of minutes or hours, for example, at least 5 minutes, at least 10 minutes, at least 30 minutes, or at least one hour.

The invention is based on the finding that an increase in the wheel bearing temperature initially results in a heating-up of the body surrounding the wheel bearing (for example, the wheel hub), i.e., a storage of heat energy (enthalpy) in the body. Unsteady heat conduction takes place in the body, in which case a time-variable heat flow flows from the wheel bearing to a surface of the wheel bearing assembly. From the surface, the heat is ultimately dissipated, via heat transmission, to the environment. During the unsteady heat conduction, the temperature in the body is a function of time. The temperature at the surface of the wheel bearing assembly therefore likewise varies over time. The unsteady heat conduction takes place until a stationary state, i.e., a state that is independent of time, is possibly reached, in which state the temperatures no longer change over time and a constant heat flow from the wheel bearing to the environment takes place.

At least a portion of the heat forming in the wheel bearing is conducted, according to the invention, via the heat-conducting paths to the temperature-measuring elements. The more energy that can be stored in a heat-conducting path, for example, due to its material properties or its volume or its length, the more slowly the heat penetration takes place, i.e., the propagation of the temperature increase. The invention makes use of this finding by providing for different heat-conducting paths, which effectuate a delayed heating of one of the temperature-measuring elements as compared to the other temperature-measuring element. A temperature increase at a first end of the first heat-conducting path and an identical temperature increase at a first end of the second heat-conducting path result in delayed temperature increases, in each case, at a second end of the first heat-conducting path and at a second end of the second heat-conducting path, wherein the delays are different. The first ends of the heat-conducting paths face the axle bearing, in particular, while the second ends of the heat-conducting paths face the temperature-measuring elements.

The change in the temperature, over time, in a volume element of a body depends, in particular and inter alio, on the thermometric conductivity of the body. The thermometric conductivity is defined as the quotient of the heat conductivity λ and the product of density ρ and specific heat capacity at constant pressure $c_p$: $a=\lambda/(\rho \times C_p)$.

A heating-up of the wheel bearing results in a heating-up of the body or material surrounding the wheel bearing, i.e., results in a storage of heat in the body. The greater the heat conductivity λ of the body and the lower its density ρ and heat capacity $c_p$, the more rapidly the temperature increase propagates through the body.

The speed at which a temperature change in the wheel bearing is transmitted to the temperature-measuring elements also depends on the length of the heat-conducting path between the wheel bearing and the temperature-measuring element. The longer the heat-conducting path is, the greater the amount of heat is that can be stored in the heat-conducting path and, therefore, the longer it takes until the temperature of the temperature element has increased to a stationary temperature value.

Therefore, one aspect according to the invention is that, when the wheel bearing heats up, the temperature-measuring elements heat up at different rates due to different heat-storage capacities of the heat-conducting paths.

According to a second aspect of the invention, the temperature-measuring elements are triggered at different temperatures. This is based on the finding that a stationary state is not reached if the limit temperature in the wheel bearing is only briefly exceeded and, therefore, the temperature at the temperature-measuring elements is lower than in the stationary state, i.e., after the elevated bearing temperature (limit temperature) has prevailed for a relatively long time period. If at least one of the trigger temperatures is below the stationary temperature at the location of the temperature-measuring element, which stationary temperature corresponds to the limit temperature of the wheel bearing, this trigger temperature is reached before the stationary state is reached, i.e., after a relatively short time. The temperature-measuring element is triggered in this case. If the trigger temperature of the second temperature-measuring element is higher than the trigger temperature of the first temperature-measuring element, in particular is equal to the stationary temperature at the location of the temperature-measuring elements, which stationary temperature is assigned to the specified limit temperature, the second temperature-measuring element is not triggered until the limit temperature has prevailed for a longer time. Therefore, the different trigger temperatures of the temperature-measuring elements likewise deliver a piece of information about the time period during which the specified limit temperature in the wheel bearing prevailed or was exceeded.

A fundamental idea of the invention can therefore be considered that of obtaining a piece of information about the time period of the prevalence or exceeding of a limit temperature in the wheel bearing by disposing at least two separate temperature-measuring elements, each of which indicates only that a predetermined trigger temperature has been exceeded. The trigger temperatures are selected for this purpose in such a way that, at a specified limit temperature of the wheel bearing, in the case of which damage to the wheel bearing is assumed if said limit temperature is exceeded for a relatively long time, the temperature-measuring element is triggered only at the end of the critical period during which said limit temperature is exceeded, whereas the other temperature-measuring element is triggered sooner. The critical period during which said limit temperature is exceeded is, for example, at least 5 minutes, at least 10 minutes, at least 30 minutes, or at least one hour.

According to one embodiment of the invention, at least two of the heat-conducting paths have different thermal conduction properties, and so the heat from the wheel bearing is conducted to the corresponding temperature-measuring elements at different rates. In addition, preferably at least two of the temperature-measuring elements have different trigger temperatures, in order to detect a temperature increase to a temperature above the limit temperature. As a result, it is possible to display that a first limit temperature or trigger temperature was exceeded for a relatively long time period. In addition, it is also therefore possible to display that a second limit temperature or trigger temperature, which is higher than the first limit temperature or trigger temperature, was also exceeded for a relatively short time period.

In one preferred embodiment, the temperature-measuring elements are designed for implementing or undergoing a color change, which is irreversible, in particular, when its particular trigger temperature is reached. Such temperature-measuring elements, which are also referred to as thermal dots, are known, in principle, and can be based, for example, on a principle of a colored layer melting at a certain temperature. In principle, however, other visible property changes can also be provided, such as a deformation of the temperature-measuring elements.

In one preferred embodiment of the invention, the thermal conduction between the wheel bearing and the temperature-measuring element, which takes place at different rates, can be ensured in that the heat-conducting paths have different lengths. For example, one of the temperature-measuring elements can be positioned further away from the wheel bearing than the other temperature-measuring element, and/or the different lengths can be achieved by means of different, in particular at least partially curved, shapes of the heat-conducting paths. One of the temperature-measuring elements can be positioned, for example, on a region of an outer surface of the wheel bearing assembly, the distance of which from the wheel bearing is greater than the distance from the outer surface on which the other temperature-measuring element is mounted. Additionally or alternatively, at least one heat-conducting path can be provided that does not have the shape of a straight line.

The different thermal conduction and/or heat conduction can also be achieved in that the heat-conducting paths have different thermometric conductivities. This can be achieved, in particular, in that the heat-conducting paths have different heat conductivities and/or different densities and/or different heat capacities. In particular, the heat-conducting paths can have different coefficients of thermal conduction. In order to provide different thermometric conductivities, the heat-conducting paths can be made from different materials or can comprise different materials.

In a further preferred embodiment, at least one of the temperature-measuring elements is disposed on a surface of the wheel hub. The heat-conducting path in this case can be formed by the wheel hub itself. Preferably, both temperature-measuring elements are disposed in the region of the surface of the wheel hub, wherein a different rate of the thermal transmission to the temperature-measuring element can be achieved between the wheel bearing and the temperature-measuring elements as a result of different heat-conducting paths, in particular different lengths of the heat-conducting paths.

In a further preferred embodiment, one of the temperature-measuring elements can be disposed on a protruding heat-storage element, in particular on a projection formed on the wheel hub. The heat penetration of the heat-storage element, which protrudes, in particular, with respect to the adjoining surface, results in the corresponding temperature-measuring element heating up more slowly than the other temperature-measuring element, which, in particular, is not disposed on this heat-storage element. The heat penetration of the heat-storage element, therefore, is the time factor of interest. The heat-storage element or the projection can be formed, for example, by a cooling element, for example, a cooling fin, provided on the wheel hub. If one of the temperature-measuring elements is disposed on such a cooling element, the principle of the invention can be implemented in a particularly simple and cost-effective manner, even with existing wheel bearing assemblies. A cooling fin also provides an enlarged heat-transfer surface, and so, for this reason as well, a lower temperature can prevail on the surface thereof than away from the cooling fin.

For a particularly precise determination of the temperature in the wheel bearing, it is preferred that the heat-conducting paths are formed by separate heat-conducting elements. Separate heat-conducting elements are considered to be, in particular, elements that are delineated with respect to one another and are spatially separated. Therefore, a first heat-conducting element is disposed between the wheel bearing and the first temperature-measuring element, and a separate, second heat-conducting element, which is delineated from the first heat-conducting element, is disposed between the wheel bearing and the second temperature element. In this manner, the heat is transmitted from the wheel bearing to the particular temperature-measuring element deliberately along a defined heat-conducting element, which preferably connects the wheel bearing directly to the temperature-measuring element. External influences, such as, for example, heat developing in a region outside of the wheel bearing, are therefore largely shielded off. The heat-conducting elements preferably have a heat conductivity and/or a thermometric conductivity that differs from the heat conductivity or thermometric conductivity of the material surrounding it, for example, being greater than the heat conductivity or thermometric conductivity of the material surrounding it. Preferably, the heat-conducting elements are made from metal. The heat-conducting elements preferably have a heat conductivity of at least 80 W/(m²K), particularly preferably of at least 200 W/(m²K). For a defined heat conduction along the heat-conducting elements, the heat-conducting elements can be insulated with respect to their immediate environment, for example, the wheel hub. In one embodiment of the invention, this can be implemented by an air gap or an air space surrounding the heat-conducting elements. In one embodiment of the invention, the independent heat-conducting elements can be routed from the wheel bearing, through the wheel hub, to an outer side of the wheel hub. In this case, the heat-conducting elements are elements, in particular, which are delineated from the wheel hub.

Preferably, at least one of the temperature-measuring elements is directly connected to one of the heat-conducting elements, in particular its assigned heat-conducting element. The temperature-measuring element is therefore preferably applied directly onto a surface of the assigned heat-conducting element. The heat-conducting element preferably acts directly on an outer side of the wheel bearing that is intended to be monitored, and so a defined interrelationship exists between the temperature of the wheel bearing and the temperature at the temperature-measuring element. Particularly preferably, the heat-conducting element is connected or coupled to an outer side of the wheel bearing, for example, an outer bearing ring, and conducts the heat into an outer region of the wheel bearing assembly, where the temperature is detected by means of the temperature-measuring elements. Preferably, both temperature-measuring elements and heat-conducting elements are disposed in this manner.

One advantageous manner for reading the temperature-measuring elements can be achieved in that at least one of the temperature-measuring elements is disposed in the region of the outer side of a wheel cover, which is connected to the wheel hub, preferably in a detachable manner. The wheel cover provides sufficient surface area for the placement of multiple temperature-measuring elements and is easy to see from the outside. In order to transmit heat from the wheel bearing to the outer side of the wheel cover, at least one heat-conducting element is preferably disposed between the wheel bearing and the wheel cover, which heat-conducting element is preferably formed of metal. The heat-conducting element is preferably routed from an outer side of the wheel bearing to the wheel cover, wherein it can be surrounded—between the wheel bearing and the wheel cover—by an insulating air layer. Preferably, the heat-conducting element is routed from an inner side of the wheel cover, through the wheel cover, to an outer side of the wheel cover, in order to transmit the temperature in a defined manner to the temperature-measuring element disposed on the outer side of the wheel cover. Advantageously, at least two temperature-measuring elements are disposed in the region of the outer side of the wheel cover and are connected to the wheel bearing in a heat-conducting manner by means of different heat-conducting elements.

In this context, in particular, it is preferred that at least one of the heat-conducting elements comprises a spring element. In this manner, the heat-conducting element can bridge different distances to the wheel cover. The spring element can be connected to the wheel cover, for example, as an integral component of the wheel cover, in order to come to rest at a temperature-measuring point, in particular, the wheel bearing that is intended to be monitored, when the wheel cover is placed onto the wheel bearing or the wheel of the vehicle.

In one preferred embodiment, the temperature-measuring elements are disposed on different elements of the wheel bearing assembly. In this manner, different heat-conducting paths between the wheel bearing and the corresponding temperature-measuring elements automatically result. The different elements of the wheel bearing assembly can be, for example, an axle element or an axle stub, the wheel hub, or the wheel cover. For example, a first temperature-measuring element can be disposed on the wheel hub and a second temperature-measuring element can be disposed on the wheel cover or the axle element.

In a further preferred embodiment, at least one of the heat-conducting elements is disposed between the axle element and the wheel cover. The heat-conducting element can be a spring, in particular, in this case. A sliding contact is preferably formed in the region of the wheel cover. This makes it possible for the wheel hub to rotate relative to the stationary heat-conducting element.

In a further preferred embodiment, at least three temperature-measuring elements and three correspondingly assigned heat-conducting paths are provided. A first heat-conducting path assigned to a first temperature-measuring element has a different thermal conduction property than a second heat-conducting path assigned to a second temperature-measuring element. A third temperature-measuring element has a different trigger temperature than at least the first or the second temperature-measuring element. In this manner, it is possible not only to determine whether an elevated bearing temperature has prevailed for a relatively long time period, but also to make a determination about the level of the temperature. In particular, a distinction can be made, if necessary, as to whether the specified limit temperature of the wheel bearing has prevailed for a relatively long time or whether the limit temperature was substantially exceeded, possibly even only briefly. For example, the temperature-measuring elements having different assigned heat-conducting paths and, possibly, the same trigger temperatures could also trigger both of them if a considerable exceeding of the limit temperature in the wheel bearing has occurred only briefly. In this case, the third temperature-measuring element would be additionally triggered at the higher trigger temperature. However, if the limit temperature was indeed reached for a long time but was not substantially exceeded, only the temperature-measuring elements having the different heat-conducting paths are triggered, but the temperature-measuring element having the higher trigger temperature is not. According to one embodiment of the invention, at least two of the heat-conducting paths have different thermal conduction properties, and so the heat from the wheel bearing is conducted to the corresponding temperature-measuring elements at different rates. In addition, preferably at least two of the temperature-measuring elements have different trigger temperatures, in order to detect a temperature increase to a temperature above the limit temperature.

BRIEF DESCRIPTION OF THE DRAWINGS

The invention is further described in the following on the basis of preferred embodiments, which are depicted in the attached figures. In the figures.

DETAILED DESCRIPTION OF THE PREFERRED EMBODIMENTS

Figure 1:
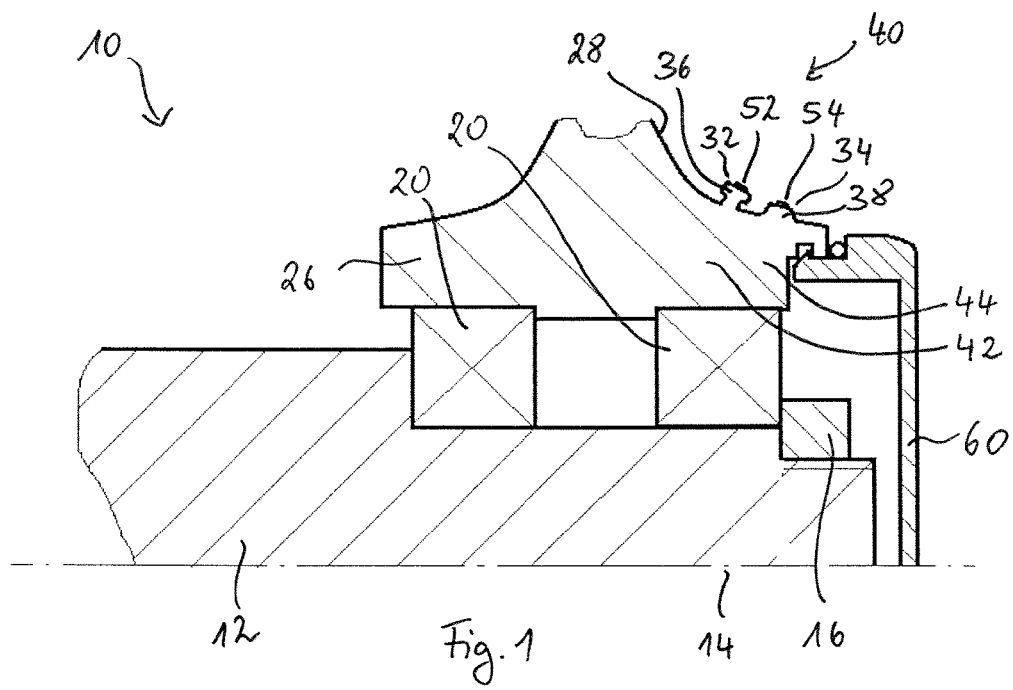
FIG. 1 shows a first embodiment of a wheel bearing assembly according to the invention.

In the figures, identical or identically acting elements are labeled using the same reference numbers. The features of the invention described with reference to the figures can also be combined with one another, in principle.

FIGS. 1-6 each show side views of a wheel bearing assembly 10 according to the invention.

The wheel bearing assembly 10 comprises a wheel hub 26, which is rotatably mounted on an axle element 12 via wheel bearings 20. The wheel bearings 20 are disposed in the interior of the wheel hub 26, between the axle element 12 and the wheel hub 26. In the depicted embodiments, the wheel bearing assembly 10 comprises two wheel bearings 20, specifically an inner bearing shown on the left and an outer bearing shown on the right. The wheel bearings 20 are axially fixed by means of an axle nut 16. The wheel bearing assembly 10 has a central wheel axis or longitudinal axis 14, which forms an axis of rotation of the wheel hub 26. A wheel cover 60 is disposed on an end face of the wheel bearing assembly 10, which wheel cover is coupled to the wheel hub 26 in such a way that said wheel cover rotates together with the wheel hub 26. The wheel cover 60 covers, on the front side, the wheel bearing 20 and the central, fixed axle element 12. The invention is described in the following on the basis of a temperature measurement or a temperature monitoring of the outer bearing shown on the right in the figures. A temperature measurement of the inner bearing can be carried out in a corresponding manner, in principle.

A temperature-measuring device 40 is provided for monitoring or checking the temperature of the wheel bearing 20. The temperature-measuring device 40 comprises at least two temperature-measuring elements, specifically a first temperature-measuring element 52 and a second temperature-measuring element 54. The temperature-measuring elements 52, 54 each detect a temperature on a temperature-measuring surface and are designed for displaying the attainment or exceeding of a predetermined trigger temperature. For this purpose, the temperature-measuring elements 52, 54 each comprise a display area, which visually changes, in particular, undergoes a color change, at a specified trigger temperature. The change in the display area is irreversible and permanent, i.e., said change remains even if the temperature drops back below the trigger temperature. The temperature-measuring elements 52, 54 have a planar configuration and are applied, in particular, adhered, to a surface of the wheel bearing assembly 10 that is visible from the outside. The temperature-measuring elements 52, 54 are therefore visible during a routine inspection, for example, a walk around the vehicle, without the need to remove elements of the wheel bearing assembly 10.

A first temperature-measuring element 52 is disposed on a first temperature-measuring surface 32 and a second temperature-measuring element 54 is disposed on a second temperature-measuring surface 34. The temperature-measuring elements 52, 54 are designed for detecting a temperature increase in the respectively assigned wheel bearing 20 that exceeds a specified limit value. The temperature-measuring elements 52, 54 are connected to the wheel bearing 20 in a heat-conducting manner for this purpose. A temperature increase taking place in the wheel bearing 20 therefore also takes place in the temperature-measuring elements 52, 54—in a delayed manner and to a lesser extent—as a result of heat conduction and thermal conduction. In this case, heat is conducted along a first heat-conducting path 42 from the wheel bearing 20 to the first temperature-measuring element 52 and along a second heat-conducting path 44 from the wheel bearing 20 to the second temperature-measuring element 54. As a result of a heat conduction and/or thermal conduction taking place at different rates along the heat-conducting paths 42, 44, the temperature-measuring elements 52, 54 heat up at different rates when the wheel bearing 20 heats up. On the basis thereof, a determination can be made as to how long a superelevated temperature prevailed in the wheel bearing 20. In one alternative embodiment, the heat-conducting paths 42, 44 can also have identical heat or thermometric conductivities, and the temperature-measuring elements 52, 54 can have different trigger temperatures. In principle, a combination of different heat-conducting paths 42, 44 and different trigger temperatures is also possible. As a result, it is possible to display that a first limit or trigger temperature was exceeded for a relatively long time period. In addition, it is also therefore possible to display that a second limit or trigger temperature, which is higher than the first limit or trigger temperature, was also exceeded for a relatively short time period.

In the embodiment according to FIG. 1, the temperature-measuring elements 52, 54 are each disposed on an outer surface or outer side 28 of the wheel hub 26. In this case, the temperature-measuring elements 52, 54 are connected to the wheel bearing 20 in a heat-conducting manner via the material of the wheel hub 26. The material located between the wheel bearing 20 and the temperature element 52, 54 in each case forms the heat-conducting paths 42 and 44, respectively.

In this embodiment, a time delay of the heating-up of one of the temperature-measuring elements 52, 54 with respect to the other temperature-measuring element can be attained, for example, in that a first temperature element 52 is disposed on a section of the outer or upper surface of the wheel hub 26 that is further removed from the wheel bearing 20 than the surface section on which the other, second temperature-measuring element 54 is disposed.

Alternatively or additionally, one of the temperature-measuring elements 52, 54 can be disposed on the surface of a heat-storage element 36, in particular a cooling element or a cooling fin. The storage element 36 stores the heat, and so the temperature-measuring element 52 disposed thereon heats up more slowly than the temperature-measuring element 54, which is offset rearward with respect thereto. The second temperature-measuring element 54 is disposed on a region of the surface of the wheel hub 26 that is offset rearward with respect to the heat-storage element 36 or cooling element, wherein this region can also be formed by a raised area 38 (which is smaller than the heat-storage element 36).

Figure 2:
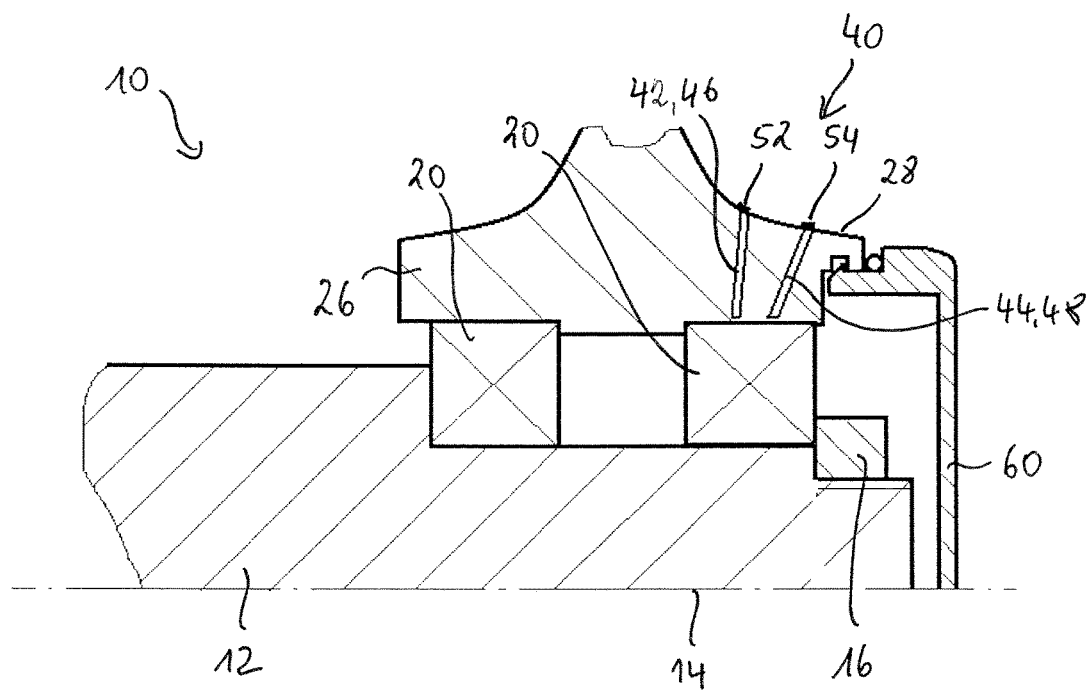
FIG. 2 shows a second embodiment of a wheel bearing assembly according to the invention.

FIG. 2 shows an embodiment having heat-conducting elements 46, 48, each of which is delineated, between the wheel bearing 20 and the temperature-measuring elements 52, 54. A first end of the heat-conducting elements 46, 48 faces the wheel bearing 20. A second end of the heat-conducting elements 46, 48 faces the temperature-measuring element 52, 54, respectively. In order to achieve a heating-up of the temperature-measuring elements 52, 54 that takes place at different rates, the heat-conducting elements 46, 48 can have different coefficients of thermal conduction, different lengths, and/or different cross-sections. The heat-conducting elements 46, 48 are routed through the wheel hub 26, specifically from an outer region of the wheel bearing 20 up to the outer side 28 or surface of the wheel hub 26. The heat-conducting elements 46, 48 preferably comprise a different material than the wheel hub 26. Alternatively or additionally, the heat-conducting elements 46, 48 can be insulated with respect to the wheel hub 26, for example, by means of an air gap between the heat-conducting elements 46, 48 and the wheel hub 26. The temperature-measuring elements 52, 54 are preferably installed directly on the material of the heat-conducting elements 46, 48. The temperature-measuring surfaces 32, 34 are therefore formed by an end of the heat-conducting elements 46, 48 disposed opposite the wheel bearing 20.

Figure 3:
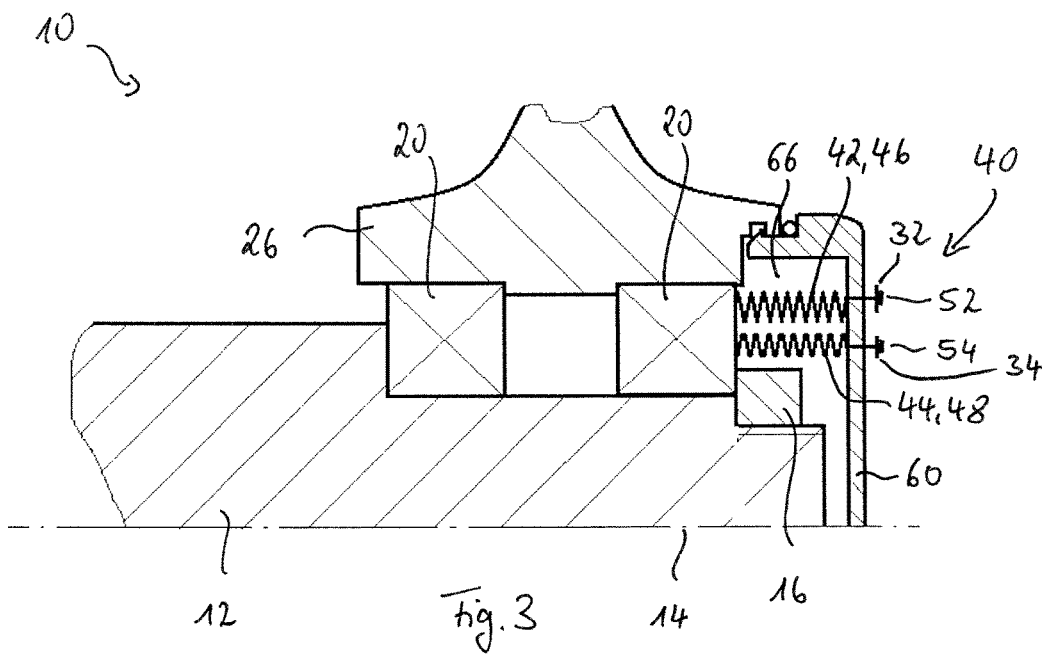
FIG. 3 shows a third embodiment of a wheel bearing assembly according to the invention.
Figure 4:
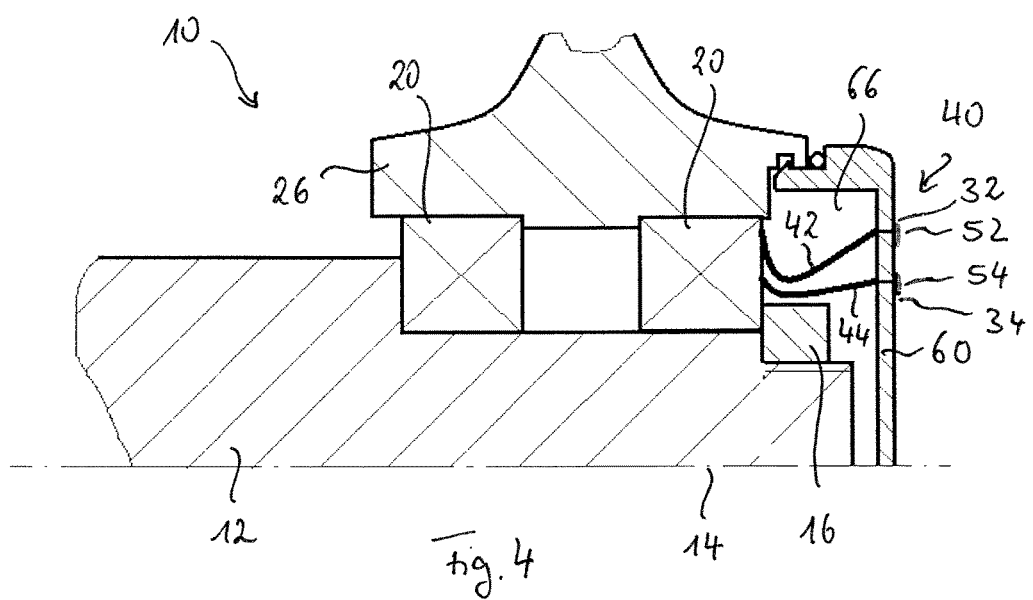
FIG. 4 shows a fourth embodiment of a wheel bearing assembly according to the invention.
Figure 5:
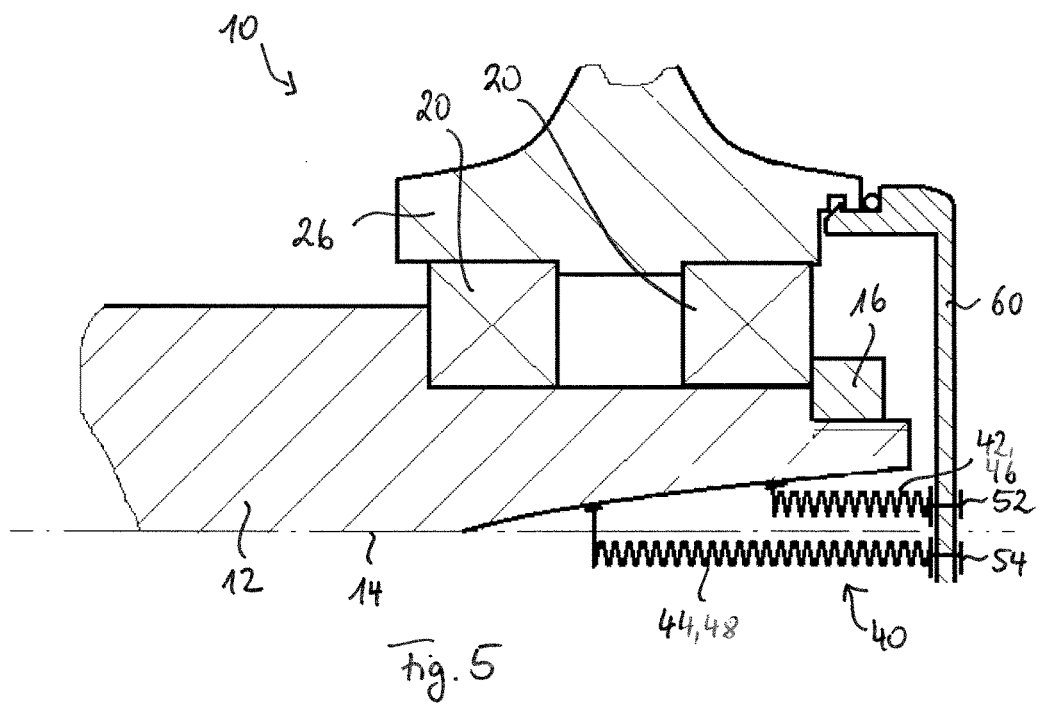
FIG. 5 shows a fifth embodiment of a wheel bearing assembly according to the invention.

FIGS. 3-5 each show an embodiment comprising heat-conducting elements 46, 48, which conduct heat generated in the wheel bearing 20 to an outer side of the wheel cover 60, where it is detected by corresponding temperature-measuring elements 52, 54.

The heat-conducting elements 46, 48 are designed as springs, thereby making it possible to bridge different differences between the wheel cover 60 and the wheel bearing 20. The heat-conducting spring elements extend from an outer side of the wheel bearing 20 up to the wheel cover 60 and preferably through said wheel cover. The temperature-measuring elements 52, 54 are installed on an outer side of the wheel cover 60 and are connected to the spring elements preferably in a heat-conducting and thermally-conducting manner. The spring elements are preferably connected to the wheel cover 60 and, in the installed state of the wheel cover 60, rest against an outer side of the wheel bearing 20, in particular against the outer bearing ring thereof. The wheel cover 60 can therefore be removed from the wheel hub 26 in the usual manner without the need to separately remove the temperature-measuring elements 52, 54. Between the wheel bearing 20 and the wheel cover, the heat-conducting elements 46, 48 extend through an air space 66, which insulates the heat-conducting elements 46, 48 and therefore ensures a deliberate and directed transmission of heat and temperature along the heat-conducting elements 46, 48.

According to FIG. 4, the heat-conducting elements 46, 48 are designed as bent spring elements or split washers. At least two spring elements, preferably made of metal, are provided. Multiple spring elements can also be disposed so as to be distributed in the circumferential direction. The spring elements can have different heat conductivities and/or thermometric conductivities and/or different lengths. The heat-conducting elements 46, 48 can also have different trigger temperatures.

In the embodiments according to FIGS. 2 to 4, the heat is tapped directly at the critical point, i.e., on the wheel bearing 20, in particular, on its outer bearing ring. A temperature increase in the wheel bearing 20 can therefore be detected particularly precisely. An elevated temperature in the wheel bearing 20 can occur, for example, as a result of a generation of heat in the bearing itself, for example, as a result of a defect of the bearing, or as a result of external influences, for example, via the brake or the wheel.

FIG. 5 shows an embodiment of a wheel bearing assembly 10 according to the invention, in which the heat-conducting elements 46, 48 do not act directly on the wheel bearing 20, but rather on the axle element 12. The heat-conducting elements 46, 48, which are designed as spring elements, for example, extend between a surface of the axle element 12 and the wheel cover 60, wherein a sliding contact is formed in the region of contact with the wheel cover 60. In order to implement different lengths of the heat-conducting elements 46, 48, in the depicted embodiment, the axle element 12 is provided with a cavity into which the heat-conducting elements 46, 48 extend. The particular contact point with the axle element 12 is located at different points, in particular different axial positions, of the axle element 12.

Figure 6:
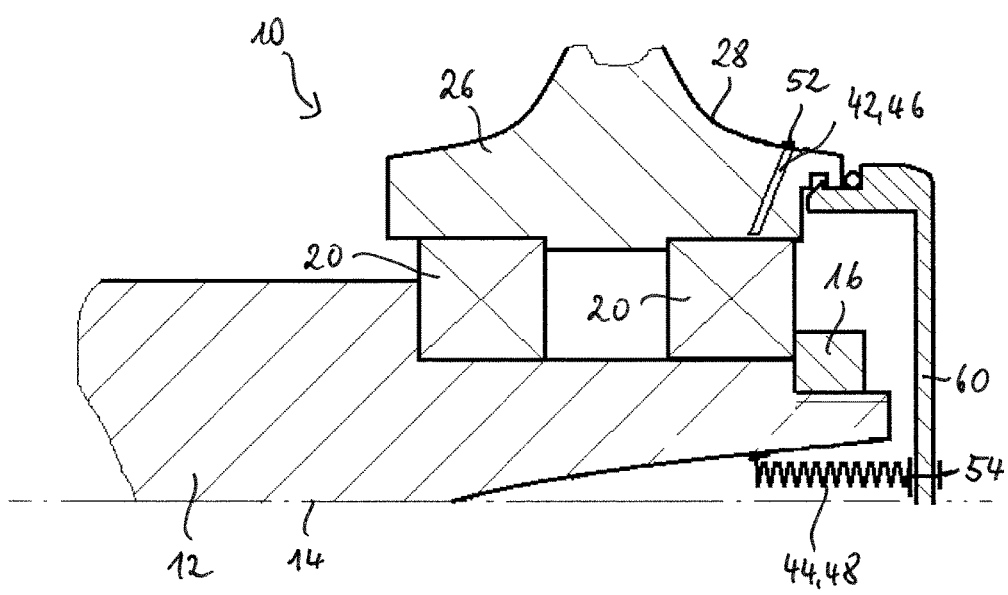
FIG. 6 shows a sixth embodiment of a wheel bearing assembly according to the invention.

FIG. 6 shows an embodiment in which the temperature-measuring elements 52, 54 are disposed on different elements of the wheel bearing assembly 10. In the depicted exemplary embodiment, a first temperature-measuring element 52 is located on a first surface of the wheel hub 26 and a second temperature-measuring element 54 is located on the wheel cover 60. In this manner, different heat-conducting paths 42, 44 are automatically implemented. A sliding contact is formed at the transition of the second heat-conducting element 48 to the wheel cover 60, as in FIG. 5.

Overall, the invention makes it possible to easily and cost-effectively determine an excessive increase in the temperature in a wheel bearing, wherein, additionally, a piece of information regarding the length of time of the excessive temperature increase is obtained. When the wheel bearing heats up, the temperature-measuring elements heat up at different rates and/or have different trigger temperatures, in particular, due to different thermometric conductivities and/or different lengths of the heat-conducting paths.

LIST OF REFERENCE NUMBERS

10 wheel bearing assembly
12 axle element 14 wheel axle
16 axle nut
20 wheel bearing
26 wheel hub
28 outer side
32 first temperature-measuring surface
34 second temperature-measuring surface
36 cooling fin
38 raised area
40 temperature-measuring device
42 first heat-conducting path
44 second heat-conducting path
46 first heat-conducting element
48 second heat-conducting element
52 first temperature-measuring element
54 second temperature-measuring element
60 wheel cover
66 air space

The invention claimed is:

1. A wheel bearing assembly, comprising:
a wheel hub mounted on an axle element by at least one wheel bearing; and
a temperature-measuring device visible from outside the wheel bearing, and configured to measure and display the exceeding of a limit temperature in the wheel bearing;
wherein the temperature-measuring device comprises at least two separate temperature-measuring elements, each of which is connected to the wheel bearing in a heat-conducting manner via a heat-conducting path and is configured to undergo a visually identifiable change at a predetermined trigger temperature; and
wherein the at least two temperature-measuring elements at least one of have different trigger temperatures, and disposed such that the at least two temperature-measuring elements heat up at different rate as the wheel bearing heats up;
wherein the heat-conducting paths are formed by separate heat-conducting elements.

2. The wheel bearing assembly as claimed in claim 1, wherein the temperature-measuring elements are configured to irreversibly change color when the trigger temperature is reached.

3. The wheel bearing assembly as claimed in claim 2, wherein the heat-conducting paths have different lengths, and wherein one of the temperature-measuring elements is positioned further away from the wheel bearing than the other temperature-measuring element.

4. The wheel bearing assembly as claimed in claim 3, wherein the heat-conducting paths have different thermometric conductivities.

5. The wheel bearing assembly as claimed in claim 4, wherein the temperature-measuring elements are disposed on a surface of the wheel hub.

6. The wheel bearing assembly as claimed in claim 5, wherein one of the temperature-measuring elements is disposed on a protruding heat-storage element on a projection of the wheel hub.

7. The wheel bearing assembly as claimed in claim 5, wherein at least one of the temperature-measuring elements is directly connected to a heat-conducting element.

8. The wheel bearing assembly as claimed in claim 7, wherein at least one of the heat-conducting elements comprises a spring element.

9. The wheel bearing assembly as claimed in claim 8, wherein at least one of the temperature-measuring elements is disposed in the region of the outer side of a wheel cover, which is detachably connected to the wheel hub.

10. The wheel bearing assembly as claimed in claim 9, wherein at least one of the heat-conducting paths is formed by the wheel hub, and wherein one of the temperature-measuring elements is spaced further away from the wheel bearing than the other of the at least one temperature-measuring element.

11. The wheel bearing assembly as claimed in claim 10, wherein the temperature-measuring elements are disposed on different elements of the wheel bearing assembly.

12. The wheel bearing assembly as claimed in claim 11, wherein at least one of the heat-conducting elements is disposed between the axle element and the wheel cover, and wherein a one sliding contact is formed between the heat-conducting element and the wheel cover.

13. The wheel bearing assembly as claimed in claim 12, wherein the at least two temperature-measuring devices comprise at least three temperature-measuring elements and at least three correspondingly assigned heat-conducting paths.

14. The wheel bearing assembly as claimed in claim 13, wherein the at least three temperature-measuring elements includes first, second and third temperature-measuring elements, and the at least three heat-conducting paths includes first, second and third heat-conducting paths, wherein the first heat-conducting path, which is assigned to the first temperature-measuring element, has a different thermal conduction property than the second heat-conducting path, which is assigned to the second temperature-measuring element, and wherein the third temperature-measuring element has a different trigger temperature than at least the first or the second temperature-measuring elements.

15. The wheel bearing assembly as claimed in claim 1, wherein the heat-conducting paths have different lengths, and wherein one of the temperature-measuring elements is positioned further away from the wheel bearing than the other temperature-measuring element.

16. The wheel bearing assembly as claimed in claim 1, wherein the heat-conducting paths have different thermometric conductivities.

17. The wheel bearing assembly as claimed in claim 1, wherein the temperature-measuring elements are disposed on a surface of the wheel hub.

18. The wheel bearing assembly as claimed in claim 1, wherein one of the temperature-measuring elements is disposed on a protruding heat-storage element on a projection of the wheel hub.

19. The wheel bearing assembly as claimed in claim 1, wherein at least one of the temperature-measuring elements is directly connected to a heat-conducting element.

20. The wheel bearing assembly as claimed in claim 1, wherein at least one of the heat-conducting elements comprises a spring element.

21. The wheel bearing assembly as claimed in claim 1, wherein at least one of the temperature-measuring elements is disposed in the region of the outer side of a wheel cover, which is detachably connected to the wheel hub.

22. The wheel bearing assembly as claimed in claim 1, wherein at least one of the heat-conducting paths is formed by the wheel hub, and wherein one of the temperature-measuring elements is spaced further away from the wheel bearing than the other of the at least one temperature-measuring element.

23. The wheel bearing assembly as claimed in claim 1, wherein the temperature-measuring elements are disposed on different elements of the wheel bearing assembly.

24. The wheel bearing assembly as claimed in claim 1, wherein at least one of the heat-conducting elements is disposed between the axle element and the wheel cover, and wherein a one sliding contact is formed between the heat-conducting element and the wheel cover.

25. The wheel bearing assembly as claimed in claim 1, wherein the at least two temperature-measuring devices comprise at least three temperature-measuring elements and at least three correspondingly assigned heat-conducting paths.

26. The wheel bearing assembly as claimed in claim 25, wherein the at least three temperature-measuring elements includes first, second and third temperature-measuring elements, and the at least three heat-conducting paths includes first, second and third heat-conducting paths, wherein the first heat-conducting path, which is assigned to the first temperature-measuring element, has a different thermal conduction property than the second heat-conducting path, which is assigned to the second temperature-measuring element, and wherein the third temperature-measuring element has a different trigger temperature than at least the first or the second temperature-measuring elements.

\* \* \* \* \*